Sept. 30. 1947.  C. S. ROBINSON  2,428,293
VIBRATION ABSORBING MOUNT
Filed Dec. 8, 1943  2 Sheets-Sheet 1
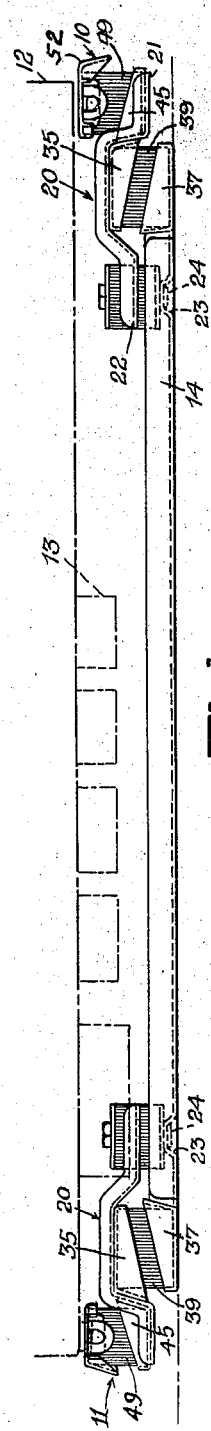
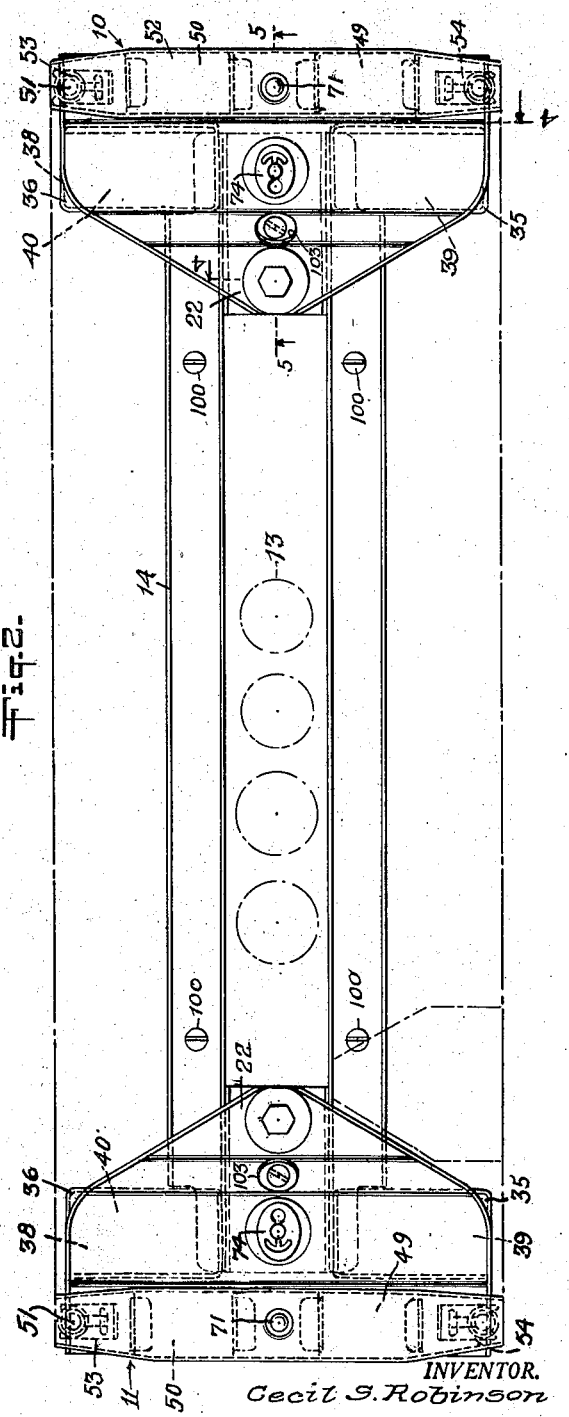
INVENTOR.
Cecil S. Robinson
BY
Munn, Liddy & Glaccum
Attorneys Sept. 30, 1947. C. S. ROBINSON 2,428,293
VIBRATION ABSORBING MOUNT
Filed Dec. 8, 1943 2 Sheets-Sheet 2

Witnesses

INVENTOR.
Cecil S. Robinson
BY
Attorneys

Patented Sept. 30, 1947

2,428,293

UNITED STATES PATENT OFFICE 2,428,293

VIBRATION ABSORBING MOUNT

Cecil S. Robinson, New York, N. Y., assignor of one-half to Dorothy H. Robinson, New York, N. Y.

Application December 8, 1943, Serial No. 513,381

9 Claims. (Cl. 248—22)

1

This invention relates to instrument mounts adapted to absorb vibrations, stresses and strains and particularly the higher order of the visible and invisible sustained vibrations which frequently impair the efficiency or accuracy of delicate and expensive instruments.

While my mountings are unlimited in their use they are particularly adapted for the mounting of delicate instruments, instrument boards, radio, transmitting and recording devices and similar equipment where even minute vibrations affect the proper operation of the equipment. Similarly they are adapted to other instruments such as cameras, where vibration will affect the clearness and accuracy of a recording or picture.

My devices are adapted to be used on any sort of base, whether stationary or mobile but because vibration is more often present in mobile vehicles such as airplanes and because the question of space in vehicles such as planes is of greatest importance, they are particularly adapted to this field.

It has been found that in airplanes in flight, the entire plane is subject to continuous visible and invisible vibrations of many and mixed characteristics which are transmitted through rigid or metallic parts to the various instruments in the ship. These vibrations may be absorbed in varying degrees by cushioning materials, springs and other devices. The proper loading of the cushioning material has been found to be of utmost importance, since cushioning material generally has a load ceiling, beyond which it tends to fatigue rapidly and to transmit excessive vibration rather than to restrict it and to build up harmonic vibrations within the material itself.

An object of this invention is to provide a vibration absorbing mount which will avoid any hard or metallic contact between the object supported and the supporting base along which vibrations might be transmitted.

A further object is to provide a mounting which will be adequate to absorb a substantial load but which will be compact enough to fit into very limited space.

A still further object is to provide a vibration absorbing unit which may readily be modified or adapted to various types of instruments without requiring changes in the construction and design of such instruments.

Since vibration absorption is a function of the static deflection of a shock mount under load, an object of this invention is to provide a form of construction which will permit a fairly large static deflection, but which will cause a much smaller deflection of the supporting cushions.

A further object is to provide a form of mounting in which the shock absorbing cushions will be arranged in series so that all vibration must travel first through a primary set of cushions and then through a secondary set before such vibration can reach the supported object.

Other advantages and objects of my invention will become apparent as the description proceeds.

In the accompanying drawings—

Figure 1 is a side elevation of my mounting as applied to a supported instrument;

Fig. 2 is a plan view thereof;

Figure 3:
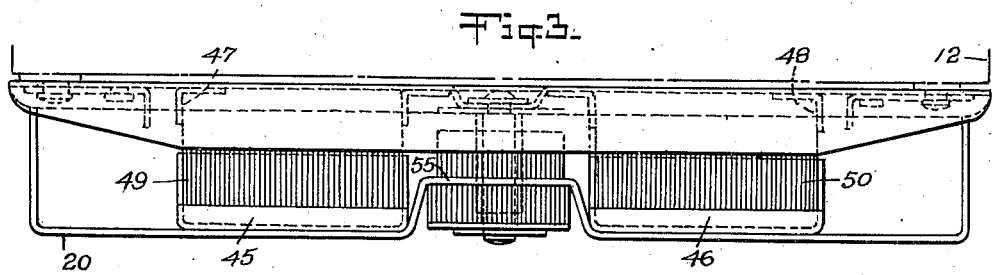
Fig. 3 is an end view of said mounting.
Figure 4:
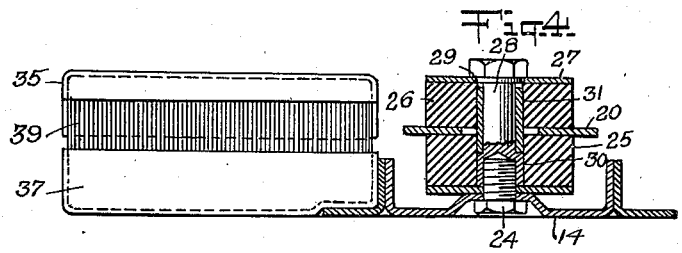
Fig. 4 is a cross sectional view taken on the line 4—4 of Fig. 2.

Referring more particularly to Figures 1 and 2 of the drawings, identical mountings 10 and 11 are shown supporting at either end an oblong instrument 12. The instrument supported is unimportant to the invention but in the present instance it will be seen that depending elements 13 require clearance below the instrument 12.

It will be readily seen that the most important element is the linkage between the instrument 12 and the base of the support 14. Mounted at either end of the support 14 are the absorption mounts 10 and 11. It will be appreciated, however, that these mounts may be placed nearer the center or at any balanced position with relation to the center of gravity of the device to be supported.

Referring to the mounting 10 it will be seen that I provide a floating frame 20 which, at one end 21 thereof, is substantially the width of the object to be supported while the other end 22 is narrowed down to a point. The floating frame 20 may be of any desired or convenient shape but as shown is formed to conserve the utmost space. Base 14 is raised slightly at 23 to accommodate the bolt 24 which engages the sleeve bolt 28. This assembly extends through the base 14, the cushion 25, an aperture in the floating frame 20, a cushion 26, and the retention plate 27. An insulating sleeve 31 surrounds the sleeve bolt 28 at its upper end and the sleeve bolt 28 is enlarged at 30 to receive the bolt 24 and to position the insulating sleeve 31. The opening 29 in the retention plate 27 is slightly larger than the diameter of the sleeve bolt 28. A floating frame 20 is positioned by the cushioning members 25 and 26 and the aperture therein is wider than the diameter of the sleeve bolt 28 and the sleeve 31 in order that plate 20 can in no way contact the bolt or sleeve to transmit vibrations.

Mounted on the underportion of the floating frame 20 are a pair of sockets 35 and 36. Corresponding sockets 37 and 38 are mounted in the base 14. Sockets 37 and 38 are identical. Positioned between the sockets 35 and 37 is a resilient cushion 39 while positioned between the sockets 36 and 38 is a resilient cushion 40. At the end 21 of the floating frame 20 are mounted a pair of sockets 45 and 46 while mounted immediately above them on the plate 52 are corresponding sockets 47 and 48. Between the sockets 45 and 47 is a resilient cushion 49 while the corresponding cushion 50 is mounted between the sockets 46 and 48. Sockets 47 and 48 and the plate 52 are supported by the cushions 49 and 50. It will be noted that the ends of the sockets are slightly flared to allow for longitudinal movement. The sockets 47 and 48 are attached to the plate 52 which has provided thereon catch members 53 and 54 adapted to receive studs such as 51 of the object to be supported.

It will be appreciated that any vibrations transmitted to the base 14 will be absorbed through the cushions at 25 and 26, cushions 39 and 40, and the cushions 49 and 50 and will thus be reduced to a minimum before reaching the studs 51.

Figure 5:
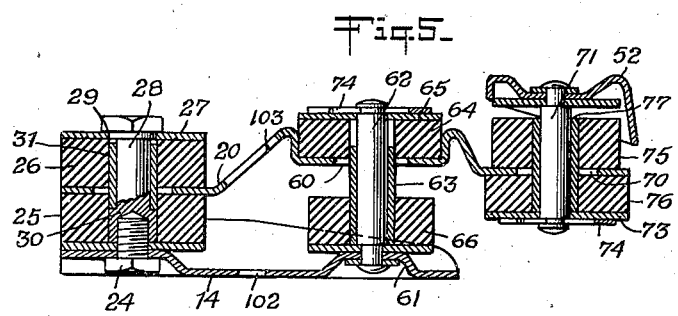
Fig. 5 is a cross sectional view taken on the line 5—5 of Fig. 2.

In order to limit the vertical movement of the mount and to prevent the displacement of the cushions 39, 40, 49 and 50 the structure most clearly shown in Figure 5 is provided. There the floating frame 20 has an upward extension 55 which is recessed at 60 while the base 14 is bent upwardly at 61. Pin 62 extends through the base 14 and through the floating frame 20 being insulated from the floating frame by the sleeve 63. A cushion 64 is provided between the floating frame 20 and the retaining plate 65 and a further cushion 66 is mounted on the base 14. Floating frame 20 is so bent as to form a socket about the cushion 64.

Floating frame 20 is again provided with an opening 70 immediately under the plate 52. Pin 71 extends through the plate 52, the opening 70 in the floating frame 20 and through the supporting plate 73 and is locked in place by the lock washer 74. Cushions 75 and 76 are provided on either side of floating frame 20 and a sleeve 77 may likewise be provided to thoroughly insulate the cushions from the floating frame 20.

It will thus be seen that should any excess vertical movement occur such as a sudden loss of altitude of a plane the structure just described and shown in cross section in Figure 5 will prevent cushions 39 and 40 and 49 and 50 from being dislodged from their sockets. This eliminates the necessity for extending fastening means through said cushions and possible transmission of vibration through said fastening means.

The frame 14 will naturally vary somewhat in accordance with the nature of the article to be supported, its length, width, etc. In the illustration shown, I have provided screws 100 by which it may be fastened to a platform. I have also provided additional screw openings 102 and the floating frame 20 may be cut away as at 103 in Figure 5 to give ready access to said screws. Locking washers 74 may be used on pins instead of bolts in another construction and many other modifications may be made without departing from the spirit of my invention.

Figure 6:
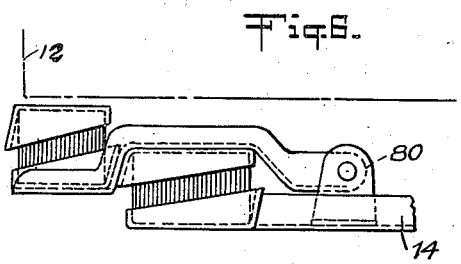
Fig. 6 is a side elevation of a slightly modified form of my device.

In the modification shown in Figure 6, the operation is the same as that previously described with the exception that a fixed pivot 89 engages the base 14 rather than the cushion supported bolt 28. This construction, while possibly less efficient, would be adequate for said insulations.

Throughout the description I have referred to supporting cushions as resilient cushions and they may be of any suitable material depending upon the amount of vibration and its amplitude. They may be made of soft sponge rubber, felt or plastics. In the several modifications the same principle is involved, namely, the linkage between the base and the supported object in which longitudinal or vertical vibrations are absorbed not only by the cushion characteristics but by intermediate resilient cushions.

I claim:

1. In a vibration mounting a base, a floating member supported at one end thereof between a pair of resilient cushions, a pair of resilient cushions mounted on the opposite end of said floating member, a plate on said resilient cushions, means on said plate adapted to engage the object to be supported, and a pair of resilient cushions on said base engaging said floating member intermediate its ends.

2. In a vibration mounting a supporting base, means for supporting an object thereon, said means including a floating member having one end thereof attached to said base between a pair of resilient cushions, a second pair of resilient cushions mounted on the other end of said floating member adapted to engage the object to be mounted, and a third pair of resilient cushions mounted on said base and engaging said floating member intermediate its ends.

3. In a vibration mounting a supporting base, means for supporting an object thereon, said means including a floating member having one end thereof attached to said base between a pair of resilient cushions, a second pair of resilient cushions mounted on the other end of said floating member adapted to engage the object to be mounted, and a third pair of resilient cushions mounted on said base, and means for limiting the movement of said floating member away from said base.

4. A vibration mounting including an object to be supported, a supporting base and connecting means therebetween, said connecting means including a member mounted between resilient cushions on said base, said member having a resilient mounting at the opposite end thereof adapted to support the object, and additional resilient means between said member and the base intermediate the ends of said member.

5. A vibration mounting including an object to be supported, a supporting base and connecting means therebetween, said connecting means including a member mounted between resilient cushions on said base, said member having a resilient mounting at the opposite end thereof adapted to support the object, additional resilient means between said member and the base intermediate the ends of said member, and additional resilient means limiting the movement of said member away from said base.

6. A vibration mounting adapted to be positioned between a base and an object to be supported comprising a rigid floating member and three resilient members, one of said resilient members positioning one end of said rigid member, another of said resilient members being mounted on the other end of said rigid member, and another resilient member being positioned intermediate the ends of said rigid member each of the said two last mentioned resilient members contacting only one side of said rigid member.

7. A vibration mount adapted to be positioned between a base and an object to be supported, comprising a rigid floating member free to vibrate in all directions and three resilient members, one of said resilient members positioning one end of said rigid member, another of said resilient members being mounted on the other end of said rigid member, and another resilient member being positioned intermediate the ends of said rigid member, each of said two last-mentioned resilient members being positioned on opposite sides of said rigid member and contacting only one side thereof.

8. In a vibration absorbing unit, the combination of a supporting base, a supported object and a floating member, between said base and object, a resilient cushion intermediate the ends of said floating member, a resilient cushion at one end of said floating member, between it and the object to be supported, and a third resilient member at the other end of said floating member between it and the base.

9. A vibration mounting for positioning two objects with respect to each other, including means for limiting the transmission of vibration between said objects, said means including an intermediate member free to vibrate in all directions, a resilient cushion at one end of said intermediate member between it and one of said objects, a second resilient cushion intermediate the ends of said intermediate member and means resiliently connecting said intermediate member to the other of said objects.

CECIL S. ROBINSON.

REFERENCES CITED

The following references are of record in the file of this patent:

UNITED STATES PATENTS

| Number | Name | Date |
|---|---|---|
| 2,338,323 | Fink | Jan. 4, 1944 |
| 2,020,119 | Longley | Nov. 5, 1935 |
| 2,038,603 | Roche | Apr. 28, 1936 |
| 2,055,279 | D'Aubarede | Sept. 22, 1936 |
| 1,209,322 | Neal | Dec. 19, 1916 |
| 1,423,006 | Morgan | July 18, 1922 |
| 2,097,309 | Sanders | Oct. 26, 1937 |

FOREIGN PATENTS

| Number | Country | Date |
|---|---|---|
| 313,871 | Great Britain | Apr. 23, 1929 |